United States Patent
Keskar et al.

(10) Patent No.: US 6,829,668 B2
(45) Date of Patent: Dec. 7, 2004

(54) SYSTEM FOR FINDING DATA RELATED TO AN EXAMPLE DATUM ON TWO ELECTRONIC DEVICES

(75) Inventors: Dhananjay V Keskar, Beaverton, OR (US); Dean J Sanvitale, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 530 days.

(21) Appl. No.: 09/750,550

(22) Filed: Dec. 28, 2000

(65) Prior Publication Data

US 2004/0225791 A1 Nov. 11, 2004

(51) Int. Cl.⁷ .................................................. G06G 1/00
(52) U.S. Cl. .............................. 710/305; 707/3; 707/7; 707/2; 707/10
(58) Field of Search ............................... 710/305–306, 710/309, 315, 316, 241, 243, 300, 105, 110, 112; 707/30, 201, 101–104, 1–10; 709/206, 222, 227–229, 248

(56) References Cited

U.S. PATENT DOCUMENTS

| | | | | |
|---|---|---|---|---|
| 5,189,632 A | * | 2/1993 | Paajanen et al. | 707/201 |
| 5,790,974 A | * | 8/1998 | Tognazzini | 707/204 |
| 6,049,796 A | * | 4/2000 | Siitonen et al. | 707/3 |
| 6,202,068 B1 | * | 3/2001 | Kraay et al. | 707/102 |
| 6,286,060 B1 | * | 9/2001 | DiGiorgio et al. | 710/31 |
| 6,457,062 B1 | * | 9/2002 | Pivowar et al. | 709/248 |
| 6,466,951 B1 | * | 10/2002 | Birkler et al. | 707/201 |
| 6,475,146 B1 | * | 11/2002 | Fredlburger et al. | 600/437 |
| 6,618,732 B1 | * | 9/2003 | White et al. | 707/103 |
| 6,678,691 B1 | * | 1/2004 | Kikkers | 707/102 |

OTHER PUBLICATIONS

Fernandes et al. (U.S. Pub No. 2002/0165851).*

* cited by examiner

Primary Examiner—Paul R. Myers
Assistant Examiner—Raymond N Phan
(74) Attorney, Agent, or Firm—Pillsbury Winthrop LLP

(57) ABSTRACT

A system and method for finding items related to an example item or a set of example items in a low processing power device with limited storage are provided. The system comprises relationship agents, an item relationship database, a synchronizer, and logic for finding related items. The relationship agents are embedded in a computing device separated from the low processing power device. The relationship agents automatically build relationship information between different items based on certain criteria, including temporal relevance, content relevance and people relevance. The item relationship database is formed by the relationship agents and stores the relationship information between different items. The synchronizer transfers the item relationship database, or a portion thereof, from the computing device to the low processing power device. Using queries to the transferred item relationship database, logic embedded in the low processing power device finds items related to the example item.

33 Claims, 7 Drawing Sheets

Calendar Items Table 133a::

| DocID | Type | DateTimeStart | DateTimeEnd |
|---|---|---|---|

Terms table 133b:

| TermID | Term | NumDocsWithTerm |
|---|---|---|

Term Occurrences Table 133c:

| TermID | DocID | NumOccurrences |
|---|---|---|

Figure 4a

Document Table 135a:

| DocID | Type | Location | Author |
|---|---|---|---|

Terms Table 135b:

| TermID | Term | NumDocsWithTerm |
|---|---|---|

Term Occurrences Table 135c:

| TermID | DocID | NumOccurrences |
|---|---|---|

Figure 4b

PersonInfo table 137a:

| UserID | Name | EmailAddr |
|---|---|---|

Terms Table 137b:

| TermID | Term | NumUsersWithTerm |
|---|---|---|

UserInterests Table 137c:

| TermID | UserID | NumOccurrences |
|---|---|---|

UserDocs Table 137d:

| UserID | DocID | RelationType |
|---|---|---|

Docs Table 137e:

| DocID | Type | Location | Author |
|---|---|---|---|

Figure 4c

Document table 139a:

| DocID | Type | Location |
|---|---|---|

DocRelation table 139b:

| DocID1 | DocID2 | RelationType |
|---|---|---|

SYSTEM FOR FINDING DATA RELATED TO AN EXAMPLE DATUM ON TWO ELECTRONIC DEVICES

BACKGROUND OF THE INVENTION

1. Field of the Invention

The present invention generally relates to finding items in electronic devices, and in particular, to systems and methods for automatically finding items related to an example item in handheld electronic devices, such as personal digital assistants (PDAs) and mobile devices.

2. Related Art

Handheld devices, in particular PDAs, are used widely to facilitate users in organizing business and personal appointments, contacts, to-do list items, memos, expense reports, etc. Recent palm-size PDAs are also equipped with document readers and mini-web browsers to display additional reading material on the PDAs. The document readers may, for example, be useful for reading books and mail. Mini-web browsers allow users of the PDAs with online connection capability to roam the Internet and extract information from the Internet. Other popular handheld devices include small personal organizers, palm-size computers, and combination phone/computer devices. Many of the handheld devices also have the ability to synchronize with a desktop computer, utilizing either a synchronizer connected to the desktop computer or some sort of wireless protocol.

Due to recent technology advances, available memory of a handheld device has increased, allowing numerous items to be stored on the handheld device. However, even with the increase in available memory, the handheld device is still considered to have limited storage capacity, especially in comparison with a personal computer. Unlike personal computers, most of the handheld devices are also considered to have limited processing power. This prohibits the handheld devices from performing complex operations in a timely manner, if at all. Since battery life is of concern to users of the handheld devices, it is not sensible to keep the handheld devices on for long computations and complex operations that drain up battery power.

Currently, most handheld devices, in particular PDAs, support a rudimentary "find" utility, which looks for sub-string or keyword matches in the various items stored on the handheld. A PDA may, for example, provide a user interface for the "find" utility. When a user chooses the "find" utility, a message box appears to allow the user to enter a search string made up of characters and/or numbers. The PDA then takes the search string and compares it with strings in items stored on the PDA. Upon finding matching items containing a string or a sub-string matching the search string, the PDA displays the matching items in a list. The matching items may come from contacts, appointments, mail, to-do list items, etc. However, as the number of items stored on the PDA device and their content or size increase, the rudimentary "find" utility of searching for sub-string or keyword matches becomes less attractive. It becomes useful to allow a query by example to be performed while the user is viewing a particular item, allowing items related to the particular item to be returned.

To find items related to an example item, or the item in question, using the rudimentary "find" utility, a user would need to figure out characteristic keywords for either the example item or the related items before the search for the related items can start. Oftentimes, the user may not be able to determine characteristic keywords that correspond to either the example item or the related items in a timely fashion. When the incorrect characteristic keywords are used as the search string, the user is further delayed from finding the related items. On the other hand, the traditional method of doing a query by example is processor intensive because relationships between the example item and the related items need to be determined first. A bulk of the processing work is required to determine and verify relationships between items beyond keyword or sub-string matches. Because of the limited processing power of the PDA and other handheld devices, the traditional method of query by example cannot be implemented on a handheld device in a highly usable form. Moreover, the supporting structures and index for the traditional method of query by example is storage intensive, and would consume precious storage resources on the handheld devices. Therefore, there is a need for a system and method that go beyond sub-string or keyword matches for various items stored on a handheld device. The system and method would allow the automatic finding of items related to an example item(s) while taking into consideration the low processing power and limited storage capacity of handheld devices.

BRIEF DESCRIPTION OF THE FIGURES

FIGS. 4a, 4b and 4c illustrate entries of example database schemes for supporting databases of relationship agents according to embodiments of the present invention;

FIG. 5 depicts an illustrative example of the structure of an item relationship database according to an embodiment of the present invention;

DETAILED DESCRIPTION

Figure 1:
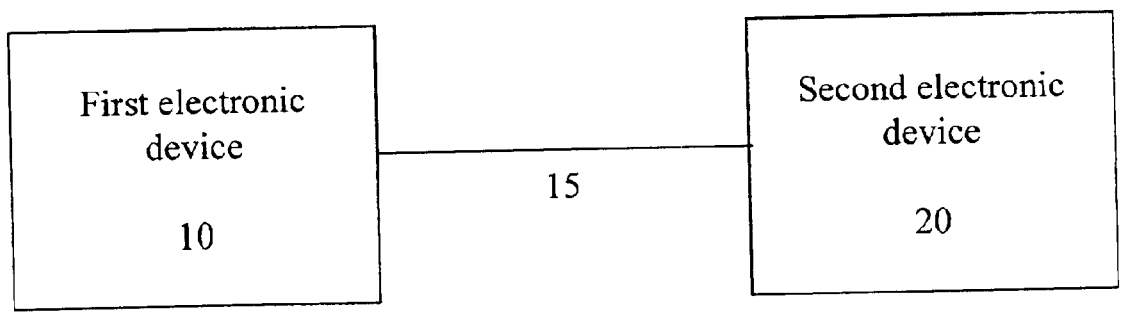
FIG. 1 illustrates an environment having two electronic devices in which embodiments of the present invention may function.

FIG. 1 illustrates an environment having two electronic devices in which embodiments of the present invention may function. The first electronic device 10 and the second electronic device 20 interact with each other through a link 15. The link 15 could be a wire-based communication line or a wireless communication line. For example, sophisticated wireless protocols, such as Bluetooth, can be utilized to allow the electronic devices 10, 20 to interact with each other. The second electronic device 20 is, in general, a handheld device that has lower processing power and limited storage capacity as compared to a regular desktop computer or a laptop computer. In one embodiment, the first electronic device 10 automatically builds relationships between different items using various criteria. The various criteria may be pre-stored on the first electronic device 10, determined by the first electronic device 10, and/or entered by a user. The items from which relationships are being built may come from several sources, including items stored on the first electronic device 10, items to be transferred to the second electronic device 20, and items stored on both electronic devices 10, 20. The items may be in formats such as documents, mail, to-do list items, memorandum, figures, pictures, and appointments.

Through the link 15, the built relationships, along with other information, are transferred from the first electronic device 10 to the second electronic device 20. Using the transferred information that includes the built relationships, the second electronic device 20 is able to determine whether a particular item or set of items is related to other items in the second electronic device 20 as well as to other items in the first electronic device 10. If a particular item or set of items is related to another item, the second electronic device 20 finds the related item by making queries into the transferred information. The related item is then displayed, and a user is allowed to access when desired.

Figure 2:
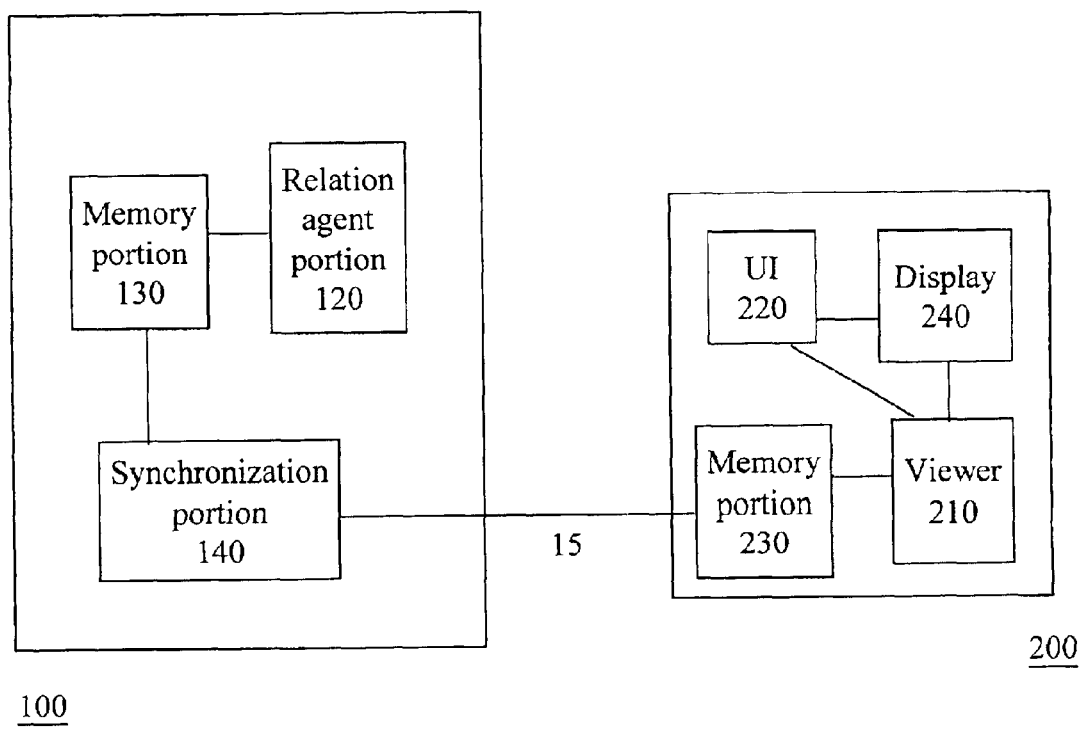
FIG. 2 shows in more detail the two electronic devices in FIG. 1 according to an embodiment of the present invention.

FIG. 2 shows in more detail the two electronic devices of FIG. 1 according to an embodiment of the invention. In this illustrative example, the first electronic device is a desktop computer 100 and the second electronic device is a handheld device 200, such as a PDA. The desktop 100 includes a memory portion 130, a relation agent portion 120, and a synchronization portion 140. The memory portion 130 stores, among other things, data items on the desktop 100 and items to be synchronized to the handheld device 200. In the preferred embodiment, the relation agent portion 120 comprises a number of relationship agents. Each relationship agent independently looks for and analyzes items to determine if any of the items is related to another item. For example, relationships may be determined between items to be synchronized and items not to be synchronized. Relationships may also be determined among items to be synchronized as well as among items not to be synchronized. The relationships between any two items, or among multiple items, may be determined based on several criteria. These criteria include similar content and related attributes. Relating two or more items that have similar content may, for example, be achieved by looking at the number of similar terms between the items. Relating two or more items that have related attributes may, for example, be achieved by associating items identifying people with contact information for the people and associating items having temporal relevance with calendar and/or to-do list items.

Upon determining relationships between the items, the relationship agents in the relation agent portion 120 stores the relationships in the memory portion 130. The relationships preferably reside in a database in the memory portion 130. Relationships are constantly added to the database when new items are added and new associations are found. Relationships are also deleted from the database when items are deleted. In one embodiment, a user may also manually add, delete, or otherwise modify relationships stored in the database. In another embodiment, a user may set a filter, or filters, to prevent a particular relationship from forming.

During synchronization between the desktop 100 and the handheld device 200, the relationships in the database are transferred from the desktop 100 to the handheld device 200 through a communication link 15. Synchronization is accomplished through the synchronization portion 140 and transfer protocols recognized by both the desktop 100 and the handheld device 200, which may be wire-based or wireless. Software programs run on both the desktop 100 and the handheld device 200 also facilitate synchronization. In one embodiment, the synchronization portion 140 does not reside in the desktop 100. Instead, the synchronization portion 140 is an external device that is connected to the desktop 100 and provides a platform on which the handheld device 200 sits during synchronization. In addition to the relationships in the database, items to be synchronized to the handheld device 200 are also transferred to the handheld device 200 during synchronization.

As shown in FIG. 2, the handheld device 200 includes, among other things, a viewer portion 210, a user interface portion 220, a memory portion 230, and a display portion 240. The memory portion 230 stores, among other thing, the relationships transferred from the desktop 100. In one embodiment, the user interface portion 220 is integrated with the display portion 240 because user interfaces are displayed on the display portion 240. In other embodiments, user interfaces are provided separately from the display portion 240, or provided both in and separately from the display portion 240. The viewer portion 210 runs on the handheld device 200. In a preferred embodiment, the viewer portion 210 provides user interface mechanisms to allow a user to ask for items related to a particular item or set of items. Upon the user invoking the user interface mechanisms, the viewer portion 210 uses the relationships in the memory portion 230 to search for items that are related to the particular item or set of items. Sometimes, the items related to the particular item or the set of items are not on the handheld device 200 but are documents residing in the desktop 100. In this case, the viewer portion 210 may display notes indicating the location of the documents in the desktop 100 and/or provide an option for the documents to be synchronized to the handheld device 200 during the next synchronization session. After finding the related items and/or notes/options corresponding to the related items, the viewer portion 210 causes the related items and notes/options to be displayed in, for example, a list. From the list, the user is able to access the related items and notes/options when desired.

Figure 3:
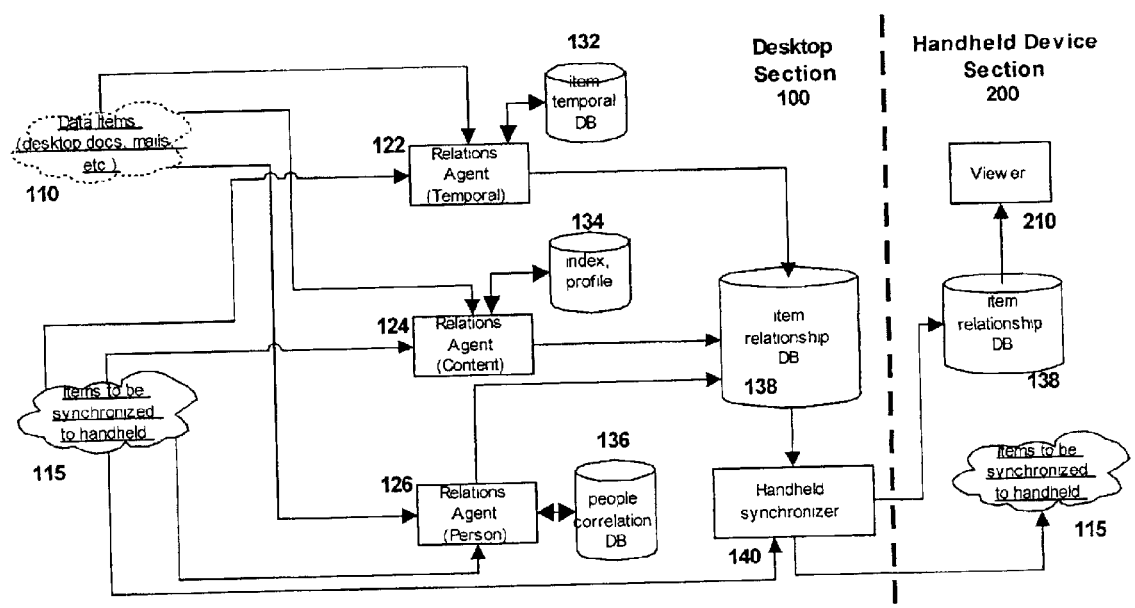
FIG. 3 shows a system for finding items related to an example item according to an embodiment of the present invention.

FIG. 3 shows a system for finding items related to an example item according to an embodiment of the present invention. The system is divided into two sections: a desktop section 100 and a handheld device section 200. In a preferred embodiment, the desktop section 100 includes data items 110 on the desktop section 100, items 115 to be synchronized to the handheld device section 200, a set of relationship agents 122, 124, 126 that finds and establishes relationship information, a set of supporting databases 132, 134, 136 that interacts with the relationship agents, an item relationship database 138 that stores relationship information established by the relationship agents, and a handheld synchronizer 140 for synchronizing data between the desktop section 100 and the handheld device section 200. In other embodiments, there may be more or fewer relationship agents or supporting databases. The handheld device section 200 includes a viewer 210 and, after synchronization, the item relationship database 138 and the items 115 to be synchronized to the handheld device section 200.

The data items 110 on the desktop section 100 and the items 115 to be synchronized to the handheld device section 200 may be collectively referred to as "documents." These documents may, for example, include mail messages, non-executable files (word processing documents, spreadsheets, slides, etc.), executable files, web pages being browsed, contact information, and common data found on a palm-size PDA. The common data found on a palm-size PDA may, for example, include memos, to-do list items, calendar/appointment items, as well as notes fields that corresponds to the aforementioned examples. The note fields provide additional information relating to the aforementioned examples. Normally, due to the limited storage capability of the handheld device 200, not all "documents" will be synchronized to the handheld device 200. Depending on the type of handheld device being used, only a selective portion of the "documents" is usually transferred to the handheld device 200 upon synchronization.

Each of the relationship agents 122, 124, 126 independently looks for and analyzes the "documents" for establishing relationships between or among items in the items 1115 or establishing relationships between or among items in the items 115 and in the data items 110. In one embodiment, the relationship agents 122, 124, 126 also analyze data items 110 on the desktop section 100 to establish relationships between or among the data items 110. In FIG. 3, three illustrative examples of the relationship agents are shown: temporal relation agent 122, content relation agent 124 and person relation agent 126. These agents use various criteria to establish the relationships. In one implementation, the temporal relation agent 122 establishes temporal relevance by associating items having temporal relevance and relating them with calendar/appointment items and/or to-do list items. For example, the temporal relation agent 122 may associate a memo having an entry that includes a date with an appointment item on that date. In one implementation, the content relation agent 124 establishes content relevance by associating items that have similar content. For example, a web page or a clipped web page item containing information about a certain service is associated with a note item containing information about the same service. In one implementation, the person relation agent 126 establishes people relevance by associating an item with a set of people and relating it with their contact information. Illustrative examples include associating a to-do list item for reviewing a document written by persons X, Y and Z with the contact information of persons X, Y and Z, and associating the contact information of a person, who wrote an e-mail summarizing a paticular experience, with a memo item related to that experience.

In one embodiment, the relationship agents 122, 124, 126 are running on the desktop section 100, in the background, all the time. Most of the contact information items, to-do list items, memos, mail and appointment items are created, or first available, on the desktop section 100. Even if they are not created on the desktop section 100, they usually become available to the desktop section 100 the next time information is synchronized between the desktop section 100 and the handheld device section 200. These items may be correlated with other items based on old information that is already on the handheld device section 200. These items may also be correlated based on new information available through other sources, which may not be synchronized. For example, mail items on the desktop section 100 are rarely synchronized, yet they are a rich source for people relevance. Mail items also contain uniform resource locators (URLs) that may be followed to correlate a person with topics of interest to the person, or his/her contact information, and ultimately synchronizing items that are about the same or similar topics.

In the preferred embodiment, the relationship agents 122, 124, 126 maintain and utilize supporting databases 132, 134, 136 to perform their tasks of finding relationships. The temporal relation agent 122 interacts with an item temporal database 132, which may store, among other things, item-time value pairs. The temporal relation agent 122 has the ability to analyze text and understand and interpret dates in various formats: 00/00/00; 00.00.00; month, date, year; month abbreviation, date, year. The temporal relation agent 122 also attempts to correlate words such as "today," "tomorrow," "yesterday" with actual dates based on other information, such as looking at the sent date in a mail item or the creation date for a file. In other embodiments, the temporal relation agent 122 may also interpret time and terms such as "hour:minute," "noon," "midnight," "AM," and "PM." As the temporal relation agent 122 finds temporal information, such as a specific date or specific time, in a particular item, an item-time value pair associating the particular item with the specific date or time is created.

FIG. 4a illustrates an example database scheme of the item temporal database 132. In this implementation, the database scheme includes a calendar items table 133a, a terms table 133b and a term occurrences table 133c. Item-time value pairs are stored in the calendar items table 133a, which includes a document identification (DocID) field, a type field, a date start time field and a date end time field. In FIG. 4a, only one illustrative entry from each of the three tables 133a, 133b, 133c is shown. The temporal relation agent 122 analyzes the "documents" to find items with temporal information and interpret the temporal information. Upon finding an item with temporal information, the temporal relation agent 122 stores the DocID of the item in the DocID field, the type of the item or the type of the relationship between the item and the temporal information in the type field, and the temporal information in the two time fields of the calendar items table 133a. Any additional textual information in the item is stored in the terms table 133b and term occurrences table 133c, both of which are utilized to enhance the temporal relevance with content information. In this example, the terms table 133b has a term identification (TermID) field that stores TermIDs of particular terms, a term field that stores the particular terms denoted by the TermIDs, and a NumDocsWithTerm field that stores the number of documents with a particular term. The term occurrences table 133c has a term identification (TermID) field that stores TermIDs of particular terms, a DocID field that stores the documents with the particular terms, and a NumOccurrences field that stores the number of occurrences of the particular terms in the corresponding documents. For each item in the "documents" that contains temporal information, a query is made based on the temporal information contained in that item. The list of items obtained as a result of the query are further filtered based on content relevance or keyword matches using the information stored in the terms table 133b and term occurrences table 133c. The relationship between the queried item and the list resulting from the query is entered into the item relationship database 138. This process is repeated as the temporal relation agent 122 searches through the documents and/or encounters newly created items. In one implementation, the item temporal database 132 is also used to associate items with various categories of time values, such as expiration time and deadline time.

The content relation agent 124 relates items by similarity of content, and it may build and use an index profile 134 (FIG. 3) in conjunction with relevance techniques. FIG. 4b illustrates an example database scheme of the index profile 134. In this implementation, the database scheme includes a document table 135a, a terms table 135b and a term occurrences table 135c. For each new "document," the content relation agent 124 strips, parses, and/or tokenizes the text within the new "document." Any new term, i.e., word forms, is added to the terms table 135b, where a TermID is automatically generated in a TermID field of the terms table 135b. Associated with the TermID field in the terms table 135b are a term field for storing terms that correspond to TermIDs and a NumDocsWithTerm field for storing the number of documents with the terms. The content relation agent 124 also makes an entry for the "document" itself in the document table 135*a* and makes an entry in the term occurrences table 135*c* for each term in the "document." The document table 135*a* includes a DocID field, a type field, a location field, and an author field. The term occurrences table 135*c* includes a TermID field, a DocID field and a NumOccurrences field. In other implementations, more or fewer fields are provided. For each of the "documents," a set of keywords is extracted, and used to query the index profile 134 to see if any document/item in the index profile 134 contains words similar to the keywords. The result of the query is a list of items that are relevant to the item used as the query basis. The relationship between the queried item and the list resulting from the query is entered into the item relationship database 138. This process is repeated as the content relation agent 124 searches through the "documents" during initialization and encounters newly created items.

The person relation agent 126 relates items to a set of people and has the ability to find information about the people associated with "documents" and then correlate the people with topics, or correlate topics with people relevance. In one embodiment, the person relation agent 126 keeps a people correlation database 136 of known and correlated people entities extracted from mail recipient and author fields, mail carbon copy and blind carbon copy fields, document author fields, file creator fields, contacts, etc. This information is utilized to find people relationship and correlate people with documents or correlate documents with similar people relationship. FIG. 4*c* illustrates an example database scheme of the people correlation database 136. In this implementation, the database scheme includes a person information table 137*a*, a terms table 137*b*, a user interests table 137*c*, a user documents table 137*d*, and a documents table 137*e*. For each item, the person relation agent 126 deduces people associated with the item. Information thus deduced is entered into the various tables, and relationships are found by a query through the tables to find people relationships. For example, persons X and Y wrote a document D which is available only on the desktop section 100, and a to-do list item (to be synchronized to the handheld device section 200) states to "review document D." In such a case, the person relation agent 126 establishes that the document D is related to persons X and Y through the author field of the document D. The person relation agent 126 also knows that the to-do list item "review document D" is related to document D. Therefore, the to-do list item is related to the contact information for X and Y. In other implementations, people who might be relevant to the item are also found, through a query based on terms in the item correlated with the terms of interest to various users. The people relationship found by the person relation agent 126 is entered into the item relationship database 138. This process is repeated as the person relation agent 126 searches through the "documents" and encounters newly created items.

The relationship agents 122, 124, 126 also search for and establish relationships for items that are first created in a handheld device section 200 and subsequently synchronized. When items are synchronized from the handheld device section 200 to the desktop section 100, they are placed in designated applications or places. For example, contacts, calendar/appointment items, memos, to-do list items may go to an application such as Microsoft Outlook. When a new item is created on the handheld device section 200, and then synchronized with the desktop section 100, the various relation agents automatically see the new item and process it.

As the relationship agents 122, 124, 126 find relationships between or among different items, they mark the relationships and add appropriate entries to the item relationship database 138. The database scheme for the item relationship database 138 is simpler than that of the supporting databases 132, 134, 136. The item relationship database 138 simply maintains relationships that have already been deduced by the relationship agents, including information such as items, their locations, and the other items with which they are related.

FIG. 5 depicts an illustrative example of the structure of an item relationship database 138 according to an embodiment of the present invention. The item relationship database 138 includes a document table 139*a* and a document relation table (DocRelation table) 139*b*. The document table 139*a* provides information pertinent to describing items that have relationships as defined by the relationship agents. In another implementation, items that do not have defined relationships are also included. An entry in the document table 139*a* may, for example, include a DocID field for denoting an item, a type field for describing the type of the item, and a location field for indicating the location of the item. The DocRelation table 139*b* illustrates relationships between or among different documents. An entry in the DocRelation table 139*b* may, for example, include a first DocID (DocID1) field, a second DocID (DocID2) field and a relation type field. The relation type field describes the relationship between item(s) denoted by DocID1 and item(s) denoted by DocID2.

Referring to FIG. 3, during synchronization, the item relationship database 138, along with the items 115 to be synchronized to the handheld device section 200, are synchronized to the handheld device section 200. In the first synchronization between the desktop section 100 and the handheld device section 200, the item relationship database 138 is simply transferred from the desktop section 100 to the handheld device section 200 and maintained on the handheld device section 200 in the same form. In subsequent synchronization, other methods may be implemented for transferring the item relationship database 138. In one embodiment, only new additions to the item relationship database 138 are transferred to the handheld device section 200. In another embodiment, the old item relationship database on the handheld device section 200 is simply overridden by the new item relationship database from the desktop section 100. In yet another embodiment, the item relationship database on the desktop section 100 is compared with the one on the handheld device section 200 to determine the new additions to the two item relationship databases and to incorporate those new additions in both item relationship databases. Preferably, there is provided a selection mechanism to allow a user to choose whether the desktop section 100 is to override the handheld device section 200, the handheld device section 200 is to override the desktop section 100, or the two sections 100, 200 are to work together to incorporate new changes during synchronization. Since the item relationship database 138, or a portion thereof, to be transferred, contains correlation and relations that have already been deduced by the relationship agents, the actual synchronization is not slowed by having the desktop section 100 determine relationships then. Moreover, this helps in reducing storage requirements on the handheld device section 200, as no data in the items is duplicated.

According to an embodiment of the present invention, a user interface front end is provided for the item relationship database 138. The user interface front end may be available in the desktop section 100 and/or the handheld device section 200. The user interface front end would depicts relationships stored in the item relationship database 138 and allow users to change them. This also helps the users to set their own relationships. In one implementation, the user interface allows the user to further specify rules for making relationships.

After receiving the item relationship database 138, a viewer 210 that runs on the handheld device section 200 utilizes the item relationship database 138 to quickly find and display items related to an example item or a set of example items. The viewer 210 may be a separate application, or functionality that is embedded in the handheld data viewer and/or applications. In the preferred embodiment, the viewer 210 supports the functionality of providing user interface mechanisms to allow the user to ask for items related to a particular example item or a set of example items. The viewer 210 uses the item relationship database 138 to find items that are related to the particular item or the set of items. In one implementation, the viewer 210 searches through the item relationship database 138 for the DocID that matches the document identification of the particular item or the set of items in the DocID1 or DocID2 fields in the DocRelation table 139*b*. Upon finding a matching DocID, the viewer 210 discerns the other item(s) related to the DocID and the relationship between the matching DocIDs by looking at the corresponding DocID field and the relation type field in the same entry as the matching DocID. For example, if the matching DocID is found in the DocID2 field of entry F, the viewer 210 will look at the DocID1 field of entry F for the related item(s) and the relation type field of entry F for the type of relationship between the matching DocID and the related item(s). The viewer 210 then displays the related items appropriately and allows users to access them when desired.

Figure 6:
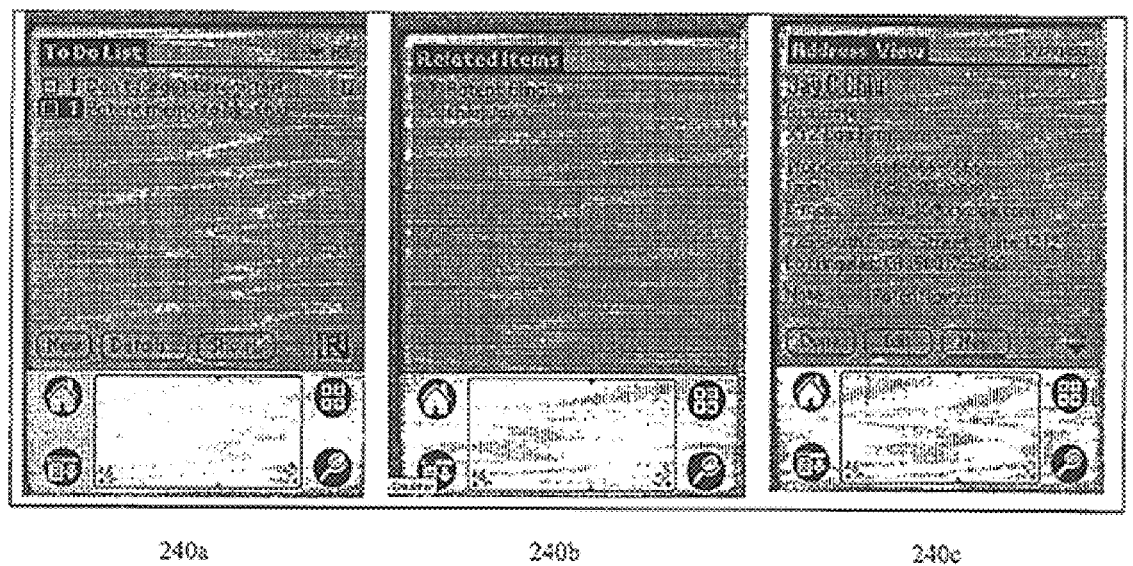
FIG. 6 shows illustrative examples of the display of a handheld device during operation of a viewer on the handheld device according to an embodiment of the present invention.

FIG. 6 shows illustrative examples of the display of a handheld device during operation of the viewer according to an embodiment of the present invention. In the embodiment, the viewer 210 is seamlessly integrated into the various display modes in the handheld device section 210. In block 240*a*, a to-do list display mode is displayed on the handheld device section 210. The to-do-list screen contains two to-do-list items: "Don't forget to register!" item and "Patent memo to Mr. Chiu" item. In this embodiment, a small button marked "R", which stands for "related," is provided in the to-do list display mode. The "R" button is also provided in other display modes, such as those for contacts, memos and calendar/appointment items. In block 240*a*, the "Patent memo to Mr. Chiu" item, i.e., the example item, is highlighted, or selected. When a user clicks on the "R" button, the viewer 210 automatically uses the DocID of the example item being selected or displayed for query into the item relationship database 138 on the handheld device section 200. In block 240*b*, a list of the various other items that are related to the "Patent memo to Mr. Chiu" item is displayed based on the query. Two related items are displayed in this case: "Patent filing" and "Chiu, Jay C." In one embodiment, respective relationship between the example item and the related items is displayed next to the related items by having the viewer 210 analyzes the relation type field. Clicking on any of the items displayed in this list in block 240*b* displays the item in the mode appropriate to the item. For example, if the related "Chiu, Jay C." item is chosen, the item is displayed in the contact display mode since it contains the contact information for "Chiu, Jay C.," as shown in block 240*c*.

Figure 7:
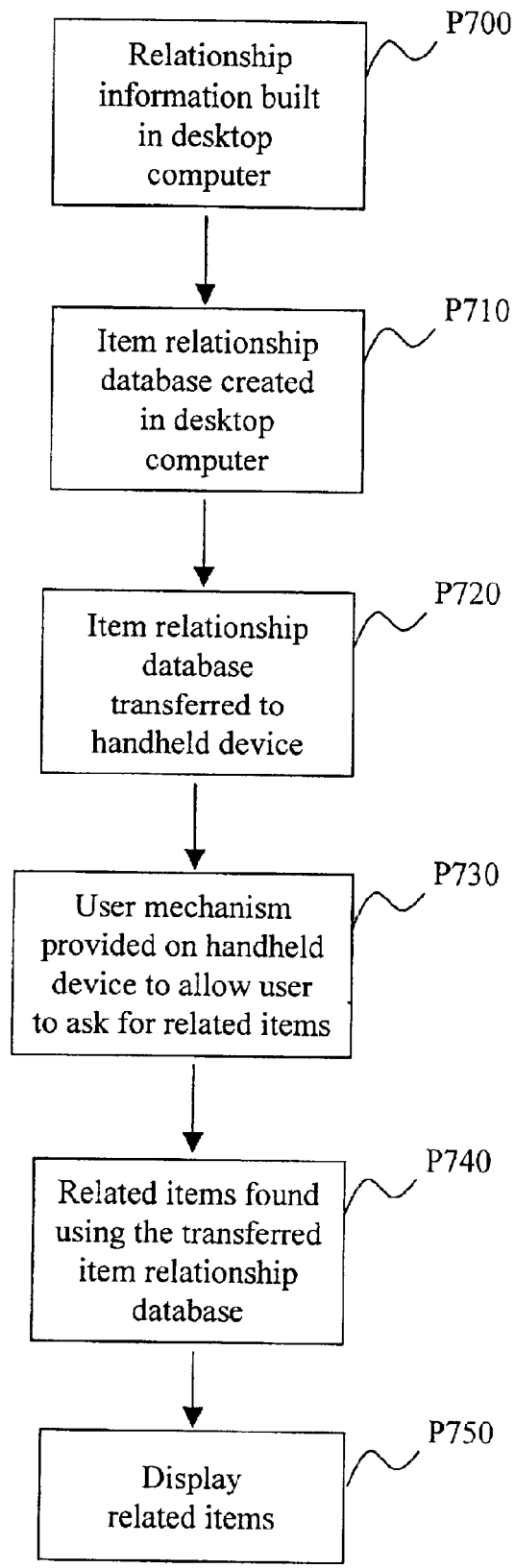
FIG. 7 illustrates processes for finding items related to an example item or a set of example items according to an embodiment of the present invention.

FIG. 7 illustrates processes for finding items related to an example item or a set of example items according to an embodiment of the present invention. In block P700, the relationship information is built between different items in a desktop computer. In one embodiment, the relationships are established by a set of relationship agents using various criteria, including temporal relevance, content relevance and people relevance. In block P710, an item relationship database that stores the relationship information is created in the desktop computer. In block P720, the item the item relationship database, or a portion thereof, is transferred from the desktop computer to a handheld device. In block P730, a user interface mechanism is provided on the handheld device to allow a user to ask for items related to the example item. When a user asks for items related to the example item, the handheld device uses the relationship information in the item relationship database to find the items related to the example item, as shown in block P740. In one embodiment, the handheld device takes the example item and uses it as a query to the item relationship database. Upon finding entries in the item relationship database with an item identification that matches the example item's identification, the related items associated with the entries are discerned. In block P750, items related to the example item are displayed as the handheld device finds them. Here, the scope of the query is an example item or a set of items on the handheld device. As a result, the handheld device satisfies the result of the query with minimal computation, using local data that was previously synchronized to it. The handheld device does not need to connect to some other computer for satisfying the find by example query.

Embodiments of the present invention as set forth above allow users of handheld devices to automatically find items that are related to a particular example item or a set of example items. That is, a query by example is provided while users are viewing a particular item or a set of items. This is achieved on handheld devices despite their low processing power and limited storage capacity. By distributing the necessary operations, a first electronic device, such as a desktop computer, is used to do the bulk of the processing work, while a second electronic device, such as a handheld device, supports interface and other lightweight operations. Since the processing is done on the desktop computer, relationships beyond keyword matches can be captured and noted with ease. Pre-computation of relationships between or among items is achieved in the first electronic device, and the pre-computation relationships are transferred to the second electronic device for quick display of related items by looking up the information in the transferred relationships. With the ability to display items with relationships beyond keyword matches or to implement a query by example (e.g., find by example) in a practical approach without being processor intensive and without much storage resources consumption, users no longer have to try to determine characteristic keywords for a particular item to search for items related to the particular item. Instead, the related items are automatically found and listed while users are viewing a particular item. The users are allowed to access the related items when desired.

While the description above refers to particular embodiments of the present invention, it will be understood that many modifications may be made without departing from the spirit thereof. For example, instead of carrying out synchronization between a desktop section and a handheld device section, synchronization is completed with a server broadcasting item relationship database to a handheld device, wherein the server builds the item relationship database containing the relationship information of different items. In another example, instead of interacting with supporting databases to perform their tasks, relationship agents interact solely with the item relationship database in finding and establishing relationships between different items. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A handheld device that supports query by example, comprising:
   a data relationship database that stores pre-computed relationship information about data residing in different applications on a remote electronic device;
   a user interface mechanism that allows a user to query for data related to an example datum;
   logic that uses the relationship information in the data relationship database to find data related to the example datum; and
   a display that displays the data related to the example datum when the user interface mechanism is invoked, wherein the related data are related to the example datum by possessing a same term, the same term being one of a same word contained in the data, a same string of words contained in the data, and a same calendar date contained in the data.

2. The handheld device of claim 1, wherein the handheld device has low processing power and limited storage capacity as compared to a personal computer.

3. The handheld device of claim 1, wherein the pre-computed relationship information is built based on criteria, including at least one of temporal relevance, content relevance and people relevance.

4. The handheld device of claim 1, wherein the data relationship database includes a document table for storing type and location information of data and a document relation table for storing correlation among data and a description of the type of relationship for the data.

5. The handheld device of claim 1, further comprising a user interface front end to the data relationship database that allows a user to modify the pre-computed relationship information, set the user's own relationship information, or set rules for making the relationship information.

6. The hand-held device of claim 1, wherein the different applications are one of a calendar application, an email application, a to-do list application, a memo application, a word processing application, and a contacts application.

7. A method of finding data related to an example datum in a first computing device, the method comprising:
   building relationship information about data residing in different applications in a second computing device;
   forming a data relationship database that stores the relationship information in the second computing device;
   transferring the data relationship database, or a portion thereof, from the second computing device to the first computing device;
   querying for data related to the example datum; and
   using the relationship information in the data relationship database to find the data related to the example datum in the first computing device, wherein the related data are related to the example datum by possessing a same term, the same term being one of a same word contained in the data, a same string of words contained in the data, and a same calendar date contained in the data.

8. The method of claim 7, wherein the first computing device is a system with low processing power and limited storage capacity as compared to a personal computer.

9. The method of claim 7, further comprising:
   providing a user interface mechanism on the first computing device that allows a user to query for data related to the example datum; and
   displaying the data related to the example datum when the user interface mechanism is invoked.

10. The method of claim 7, further comprising making a query into a supporting database coupled to the data relationship database for finding the relationship information of a particular datum.

11. The method of claim 7, wherein the relationship information is built based on criteria, including at least one of temporal relevance, content relevance and people relevance.

12. The method of claim 7, further comprising transferring a data relationship database, or a portion thereof, from the first computing device to the second computing device.

13. The method of claim 7, further comprising providing a user interface front end to the data relationship database that allows a user to modify the relationship information stored in the data relationship database, set the user's own relationship information, or set rules for making the relationship information.

14. The method of claim 7, wherein the different applications are one of a calendar application, an email application, a to-do list application, a memo application, a word processing application, and a contacts application.

15. A computer readable medium for use in conjunction with a first computing device and a second computing device for finding data related to an example datum in the first computing device, the computer readable medium including computer readable instructions encoded thereon for:
   building relationship information about data residing in different applications in the second computing device;
   forming a data relationship database that stores the relationship information in the second computing device;
   transferring the data relationship database, or a portion thereof, from the second computing device to the first computing device;
   accepting the input of the example datum; and
   using the relationship information in the data relationship database to find data related to the example datum in the first computing device, wherein the related data are related to the example datum by possessing a same term, the same term being one of a same word contained in the data, a same string of words contained in the data, and a same calendar date contained in the data.

16. The computer readable medium of claim 15, wherein the first computing device is a system with low processing power and limited storage capacity as compared to a personal computer.

17. The computer readable medium of claim 15, further comprising computer readable instruction encoded thereon for:
   providing a user interface mechanism on the first computing device that allows a user to query for data related to the example datum; and
   displaying the data related to the example datum when the user interface mechanism is invoked.

18. The computer readable medium of claim 15, further comprising computer readable instruction encoded thereon for making a query into a supporting database coupled to the data relationship database for finding the relationship information of the example datum.

19. The computer readable medium of claim 15, wherein the relationship information is built based on criteria, including at least one of temporal relevance, content relevance and people relevance.

20. The computer readable medium of claim 15, further comprising computer readable instruction encoded thereon for transferring a data relationship database, or a portion thereof, from the first computing device to the second computing device.

21. The computer readable medium of claim 15, further comprising computer readable instruction encoded thereon for providing a user interface front end to the data relationship database that allows a user to modify the relationship information stored in the data relationship database, set the user's own relationship information, or set rules for making the relationship information.

22. The computer-readable medium of claim 15, wherein the different applications are one of a calendar application, an email application, a to-do list application, a memo application, a word processing application, and a contacts application.

23. A system for finding data related to an example datum, comprising:
   at least one relationship agent contained in a first electronic device that automatically builds relationship information about data residing in different applications on the first electronic device;
   a data relationship database formed by the at least one relationship agent, the database including the relationship information about data residing in different applications on the first electronic device;
   a synchronizer that transfers the data relationship database, or a portion thereof, from the first electronic device to a second electronic device;
   a user interface on the second electronic device to accept input of the example datum; and
   logic embedded in the second electronic device that uses the relationship information in the data relationship database to find data related to the example datum, wherein the related data are related to the example datum by possessing a same term, the same term being one of a same word contained in the data, a same string of words contained in the data, and a same calendar date contained in the data.

24. The system of claim 23, wherein the first electronic device is a personal computer, and the second electronic device is a personal digital assistant.

25. The system of claim 23, wherein the second electronic device is a system with low processing power and limited storage capacity.

26. The system of claim 23, further comprising:
   a user interface mechanism on the second electronic device that allows a user to query for data related to the example datum; and
   a display on the second electronic device that displays the data related to the example datum when the user interface mechanism is invoked.

27. The system of claim 23, further comprising a supporting database coupled to the at least one relationship agent, wherein the at least one relationship agent queries the supporting database to find the relationship information of the example datum.

28. The system of claim 23, wherein the relationship information is built based on criteria, including at least one of temporal relevance, content relevance and people relevance.

29. The system of claim 23, wherein the data relationship database includes a document table for storing type and location information of data and a document relation table for storing correlation among data and a description of the type of relationship for the data.

30. The system of claim 23, wherein data related to a set of example data are found.

31. The system of claim 23, wherein the synchronizer transfers of the data relationship database, or a portion thereof, from the second electronic device to the first electronic device.

32. The system of claim 23, further comprising a user interface front end to the data relationship database that allows the user to modify the relationship information stored in the data relationship database, set the user's own relationship information, or set rules for making the relationship information for the at least one relationship agent.

33. The system of claim 23, wherein the different applications are one of a calendar application, an email application, a to-do list application, a memo application, a word processing application, and a contacts application.

* * * * *